(12) United States Patent
Lorenzetti et al.

(10) Patent No.: US 12,304,530 B1
(45) Date of Patent: May 20, 2025

(54) AUTONOMOUS VEHICLE CONTROL BASED ON A PROBABILITY OF COLLISION

(71) Applicant: Zoox, Inc., Foster City, CA (US)

(72) Inventors: Joseph Lorenzetti, Foster City, CA (US); Anjali Lakshmi Pemmaraju, San Francisco, CA (US); Shahriar Sefati, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 238 days.

(21) Appl. No.: 18/080,978

(22) Filed: Dec. 14, 2022

(51) Int. Cl.
*B60W 60/00* (2020.01)
*B60W 30/095* (2012.01)
*B60W 50/14* (2020.01)

(52) U.S. Cl.
CPC .... *B60W 60/0027* (2020.02); *B60W 30/0956* (2013.01); *B60W 50/14* (2013.01); *B60W 60/0015* (2020.02); *B60W 2554/4041* (2020.02); *B60W 2756/10* (2020.02)

(58) Field of Classification Search
None
See application file for complete search history.

(56) References Cited

U.S. PATENT DOCUMENTS

| | | | | |
|---|---|---|---|---|
| 11,648,939 B2 * | 5/2023 | Crego | ............. | B60W 60/00272 701/301 |
| 11,697,412 B2 * | 7/2023 | Crego | ................. | G06V 20/584 701/301 |
| 11,810,365 B1 * | 11/2023 | Crego | ..................... | G06V 20/58 |
| 11,858,536 B1 * | 1/2024 | Liu | ........................ | G06N 3/0464 |
| 2005/0086003 A1 * | 4/2005 | Tarabishy | .............. | G08G 1/166 340/436 |
| 2012/0218093 A1 * | 8/2012 | Yoshizawa | ............. | G08G 1/166 340/435 |
| 2021/0046954 A1 * | 2/2021 | Haynes | ........... | B60W 60/00272 |
| 2021/0139023 A1 * | 5/2021 | Crego | ............... | B60W 30/0956 |
| 2021/0139024 A1 * | 5/2021 | Crego | ............... | B60W 30/0953 |
| 2021/0339741 A1 * | 11/2021 | Rezvan Behbahani | ...................... | B60W 30/0956 |

* cited by examiner

*Primary Examiner* — Ryan Rink
(74) *Attorney, Agent, or Firm* — EIP US LLP

(57) ABSTRACT

There are provided techniques including a system, method, and computer-readable medium for autonomous vehicle control based on a probability of collision. The method may include the steps of: receiving a vehicle trajectory associated with a vehicle and an object trajectory associated with an object, determining a vehicle probability distribution associated with the vehicle at a first time along the vehicle trajectory and an object probability distribution associated with the object at the first time along the object trajectory, determining a combined probability distribution based on the vehicle and object probability distributions, determining a relative position between the vehicle and the object at the first time based on the vehicle and object positions, determining a probability value based on the combined probability distribution and the relative position, and controlling the vehicle based on the probability value.

20 Claims, 6 Drawing Sheets

AUTONOMOUS VEHICLE CONTROL BASED ON A PROBABILITY OF COLLISION

BACKGROUND

A trajectory being followed by a vehicle may bring the vehicle into close proximity with other road users. In particular, the trajectory of the vehicle may cross a trajectory of the other road users. Such a situation may occur at an intersection, for example, or when the vehicle is travelling on a highway. In these situations, it is desirable to ensure the safety of the occupants of the vehicle as well as that of the other road users, while not impeding progress of the vehicle or other road users.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
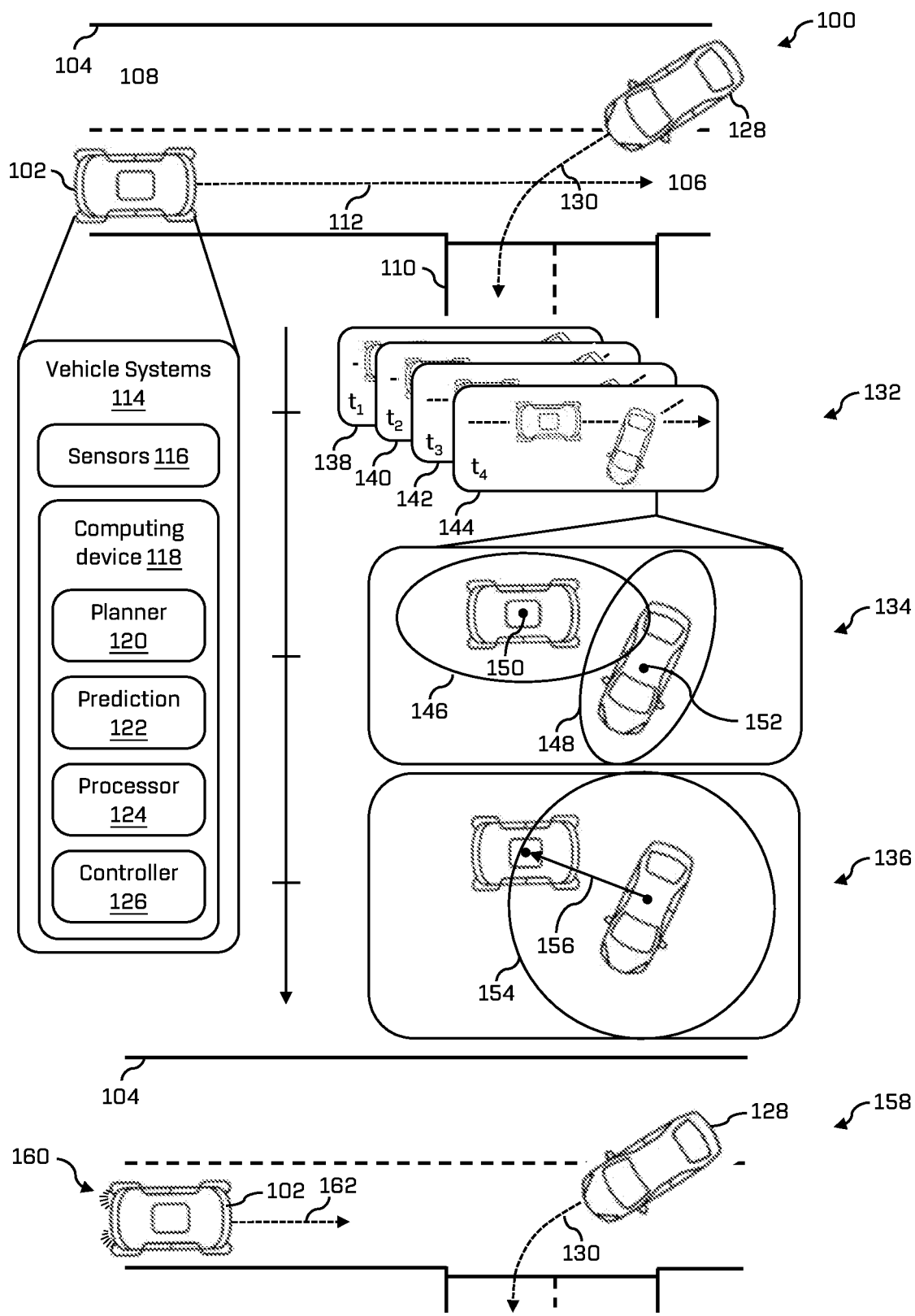
FIG. 1 is a pictorial diagram of a process for controlling a vehicle based on a probability of collision according to the present invention.

This application relates to techniques including methods, systems, and computer-readable media for controlling how a vehicle may be controlled to determine and minimize a likelihood of collision between it and other road users, referred to hereafter as agents, without impeding the progress of the vehicle. The techniques described herein may allow for more comprehensive analysis of potential collisions with an agent and suitable control of the vehicle depending upon them. This may not only improve the safety of the occupants of the vehicle and the agent, but may also allow for more nuanced control of the vehicle. The techniques described herein may also result in such improved control of the vehicle without high computational burden or requiring excessive amounts of time to perform the calculations. The application of the techniques in real-time driving situations means that avoiding computations that require long periods to process the data and return a result is preferable. Similarly, because the techniques may be applied within a vehicle computing device, avoiding large computational burden is also desirable to ensure that the computing device is able to adequately perform the processes described herein without occupying resources necessary for performing other processes.

When a vehicle is driving along a road, it may interact with one or more agents. A vehicle may interact with an agent when the agent is proximal to the vehicle, i.e., within a predetermined distance from the vehicle. During the interaction, a computing device of the vehicle may monitor the agent's movements and behavior, and may react accordingly by controlling the vehicle. In particular, the computing device may be configured to determine whether the vehicle and the agent might collide.

Other methods and systems may determine trajectories for each of the vehicle and agent and compare these trajectories. At a plurality of points in time along each trajectory, up to a predetermined future time, the predicted position of the vehicle and agent may be compared to determine if the vehicle and agent will be colliding at that point in time. The vehicle and agent may be considered to collide if, when positioned at their respective positions at the point in time, outlines or representations of the vehicle and agent touch or overlap. An indicator, which might be a value such as a risk score or a cost value, may be determined. This value may reflect at how many of the points along the trajectory or how much time along the trajectory the vehicle and agent are expected to be 'in collision'. The value may then be used to control the vehicle. The vehicle may be controlled to reduce the value, in order to reduce the risk of collision. However, because the value is determined based on an amount of time, naively controlling the vehicle to reduce the value may incentivize the vehicle to attempt to reduce the amount of time it spends in collision rather than to avoid collision altogether. In such examples, the vehicle may therefore be controlled in less conservative and undesirable ways, such as accelerating towards an agent, acting to prefer short, high speed collisions over lengthier, slow speed collisions (rather than no collision at all), and choosing alternative trajectories that are still relatively close to the agent.

To improve collision avoidance for autonomous vehicles while preventing the issues above, the techniques described herein provide methods and systems for controlling an autonomous vehicle based on a probability of collision along a particular trajectory or one or more trajectories, rather than based on an amount of time in collision. By determining probability of collision, control of the vehicle to minimize the risk of collision may result in more desirable behaviors, such as selecting a trajectory that includes the vehicle decelerating, coming to a stop to avoid a collision, or taking a path that avoids the agent. Using a probability may also allow for more nuanced control of the vehicle. Particularly, some of the calculations performed herein may be subsequently re-used to enable alternative trajectories or courses of action to be selected.

The techniques described herein may be performed for a plurality of different planned or particular trajectories for the vehicle. A planned trajectory may be one of a plurality of trajectories considered by or generated by a planning component or planner of the vehicle. Below, the techniques will be described with reference to a particular trajectory. A particular trajectory for the vehicle from among the plurality of different planned or simulated trajectories may be chosen based on a cost value determined using the techniques described below, and the vehicle may be controlled according to the chosen trajectory.

Probability of collision may be determined based on an understanding that the trajectories that are determined for the vehicle and agent are future trajectories and are therefore subject to change. For example, an uncertainty in a position of a vehicle along a particular trajectory may be relatively small over small future time periods, such as 0.1 seconds, due to the vehicle being unable to change its direction of travel or velocity too drastically over that time period. However, uncertainty may be higher over greater time periods, such as 2, 3, or 4 seconds or further. For an agent, for which less data may be available to a vehicle computing device, there may be even less certainty around where the agent will be as time increases.

This uncertainty may be referred to as positional uncertainty, and may be used to analyze a value representing a probability of collision at a particular time step or for a plurality of time steps over a particular future time period. The future time period may cover part or all of the duration of respective trajectories along which the vehicle and agent may be expected to travel. A plurality of values representing probabilities of collision at a plurality of individual time steps may be used to control the vehicle. The values may be used to generate a cost function by which the vehicle may be controlled, and/or the values may be combined to determine a further value. The further value may indicate how likely a collision between the vehicle and the agent is. The further value may represent an overall probability of collision between the vehicle and the agent. Alternatively, or additionally, the further value may be a cost value or risk score. Time uncertainty may be taken into consideration, such that times further in the future are assigned less weight than those in the more immediate future and/or such that positional uncertainty is increased with increasing time. Time uncertainty may therefore be implemented by changing how the positional uncertainty is modelled or by applying a weighting factor to probability of collision values that changes with time.

In order to determine the probability of collision for a particular future time step, the agent and the vehicle may be represented or modelled based on their probable positions at that time step. In other words, rather than assuming that the agent and vehicle will be at the exact positions indicated by their respective trajectories, the agent and vehicle may be represented by a plurality of positions, each having an associated probability value. The positions and their probabilities may be defined as a probability distribution or a probability density function, such as a normal or Gaussian distribution. In some examples, the agent and vehicle may be represented by a continuous probability density function.

The probability distributions may be determined or defined relative to a position of the vehicle or agent along its trajectory at the time step being considered. In other words, the distributions may be defined relative to the position along the trajectory rather than based on their absolute position within the environment. Defining the distributions relative to their respective positions along a trajectory may ensure that the probabilities and their respective positions are on a common scale for both the agent and the vehicle.

The common scale may allow operations to be performed on the distributions at that time step, so as to allow determination of a probability of collision. The distributions may be combined to determine a combined or overall distribution. Combining the probabilities may comprise summing the probabilities of the agent and the vehicle for the time point. The combined distribution may therefore be considered to define a probability of the position of one of the agent or the vehicle given the position of the other along its trajectory. The combined distribution may be considered to define a position of one entity, i.e. the agent or the vehicle, from the viewpoint of the other. By determining the combined distribution, a single distribution may be used to determine how likely a collision is between the agent and the vehicle.

Specifically, distributions may be combined over a relative positional space. A combined distribution may be a distribution over a relative position between the vehicle and the agent. The combined distribution may be centered at the position of the agent along its trajectory or at the position of the hero along its trajectory.

To determine a probability of collision, the combined distribution may be analyzed over a relative position between the agent and the vehicle in the relative positional space. The relative position may comprise a vector between the positions on the respective trajectories of the agent and the vehicle at the time step. To analyze over a relative position, the entity at which the combined distribution is centered may be considered to be fixed. The relative position may therefore be the position of the other entity relative to the position of the fixed entity.

In some examples, the analysis may also take into account a shape of the vehicle and/or agent, a velocity of the vehicle and/or agent, and/or a duration covered by the time step. In particular, to determine a probability of collision, the combined distribution may be analyzed over a relative velocity or trajectory between the agent and the vehicle in the relative positional space. The relative velocity or trajectory may comprise a vector. The vector may be a difference between vectors of the vehicle and the agent. The vector may be determined by determining a difference between vectors for the vehicle and the agent. To analyze over a relative velocity or trajectory, the entity at which the combined distribution is centered may be considered to be fixed. The relative velocity or trajectory may therefore be the velocity or trajectory of the other entity relative to the fixed entity.

To enable efficient analysis of the distribution, the distribution may be simplified. For example, a confidence ellipse may be determined around the distribution. The confidence ellipse may represent a so-called sigma limit, such as a three-sigma limit, on the combined distribution. The distributions may be determined based on one or more standard deviations, and the sigma limit may be determined based on one or more of the standard deviations. Outside of the confidence ellipse, the probability of collision between the vehicle and the agent may be zero, while within the confidence ellipse, the probability of collision may correspond to a value determined based on the combined distribution.

In some examples, the distribution, or a probability density function defining the distribution, may be approximated. For example, the distribution may be approximated to a quadratic function. In other examples, the distribution may be a Poisson distribution or a binomial distribution. Approximation to a quadratic function may result in the evaluation requiring less time and fewer resources. These techniques may transform the distribution from a continuous to a discrete function. The quadratic function may be defined within the confidence ellipse.

In some examples, at least the relative position and therefore the probability of collision may be considered between specific points or positions, which may be considered to represent the vehicle and agent. In some examples, the relative position may be determined between a determined center for each of the vehicle and the agent. The center may be the point indicated for the point in time along the trajectory. In some examples, the relative position may be determined based on representations of the vehicle and agent. For example, an outline of the vehicle and of the agent may be projected along the trajectory, and a shortest distance between the outlines may be determined for the current time step, for use as the relative position.

In some examples, a shape or size of the vehicle and/or agent may be used to determine a probability of collision. Taking account of shape may enable a more accurate determination of probability of collision. In some examples, one or more dimensions of the vehicle and/or agent, such as a width of the vehicle and/or agent, may be determined. The dimension or dimensions may be used to determine a plurality of points around the relative position at which the probability of collision may be determined by evaluating the distribution or a function based thereon. The distribution or function may be evaluated by determining an integral over a range defined by the plurality of points. In some examples, one or more relative positions may be determined and evaluated, based on relative shapes, orientations, or sizes of the vehicle and agent. An integral between these relative positions may also be determined. In some examples, a projection of each of the vehicle and the agent may be used to determine a dimension along which a collision might occur given their current orientations. In some examples, projections of the vehicle and the agent may be used to determine a representation of space that the vehicle and agent may occupy when they are in collision. The representation, which may be referred to as a region or area, may be propagated along a relative trajectory and the combined distribution may be evaluated for the area by integrating over one or more dimensions of the area.

Because the trajectory has a duration it may be divided into a plurality of time steps, each having a respective duration of time. For example, a trajectory having a duration of 1 second may be divided into 10 time steps, with each time step covering 0.1 seconds. The first time step relates to the time between 0 and 0.1 seconds, the second to the time between 0.1 and 0.2 seconds, and so on. Over the duration of a time step, the vehicle and the agent may move relative to one another. This may be taken into account when determining a probability of collision to enable a more accurate analysis. In order to take this into account, a probability of collision determined based on a relative position may be adjusted based on the relative velocity between the vehicle and the agent. For example, where an interval or range of relative positions is determined representing a dimension of the vehicle or agent or a region over which a collision may occur, this interval may effectively be 'swept out', by converting the interval from a line to an area. The area may represent the relative distance travelled by the vehicle and agent during the time step. This may be achieved by determining a relative velocity magnitude and multiplying an integral determined for the interval by the velocity magnitude to determine the area over which the collision may occur during that time step.

Based on at least some of the above techniques, a probability of collision over the trajectories for the agent and the vehicle may be determined, taking positional uncertainty into account. Each probability of collision may be multiplied by the time step or by a proportion of the total duration. This may provide an average or weighted the probability of collision over the total duration. In some examples, a highest probability of collision along the trajectory may be determined. In other examples, a combination of these values may be determined. A cost function may be determined based on the probability of collision for one of, some of, or all of the time steps along the trajectory. A cost value may be determined based on the cost function or on the probability of collision for one of, some of, or all of the time steps along the trajectory. The cost value may represent an overall probability of collision. The cost value may be a function of the probability of collision for one or more of the time steps.

Time uncertainty may be accounted for by determining parameters of the distributions as a function of time. This propagation of uncertainty may be performed in several ways. In some examples, underlying dynamics models may be exploited to propagate the uncertainty over time. In other examples, state information relating to the entities may incorporate such uncertainty, allowing for the propagation of it over time. In some examples, a parameter such as a standard deviation of the distribution may increase as time since a current time increases. The distributions or probability density functions thereof may be proportional to time. Alternatively, or additionally, a weighting may be applied to each probability to weight it based on how far into the future it is, with probability values further into the future being weighted less than those closer in time to a current time.

A cost function or a cost value may be used to control the vehicle. A cost value may be compared to a threshold value and action may be taken if the cost value is above the threshold value. The vehicle may be controlled in such a way that would reduce the cost value below a threshold or towards zero. For example, the vehicle may be controlled to decelerate. The vehicle may be controlled to perform a safe-stop maneuver. Alternatively, or additionally, the vehicle may be controlled to change its trajectory. The vehicle may be controlled to emit a warning to the agent, other agents, or to occupants of the vehicle. The vehicle may be controlled to continue to monitor the agent's actions. In some examples, the vehicle may implement one or more further techniques or processes, such as a process to determine a severity of collision or to determine an appropriate action. The vehicle may communicate a message to a remote computing system. The vehicle may perform the above methods for a plurality of different trajectories. If a cost value for some or all of the trajectories exceeds a threshold value, the vehicle may perform a safe-stop maneuver and may transmit a request to a teleoperator for assistance. A plurality of cost values may be compared, the cost values representing different candidate trajectories for the vehicle. A candidate trajectory may be determined or selected based on the comparison of the cost values. A vehicle may be controlled based on a total cost evaluated using a tree search, using techniques such as are described in U.S. patent application Ser. No. 17/394,334 titled "Vehicle Trajectory Control Using A Tree Search", which is incorporated by reference in its entirety herein for all purposes.

The above techniques may be applied for each agent within an environment, to ensure that a probability of collision is taken into account for all agents.

FIGS. 1 to 6 are provided to illustrate embodiments of the invention and examples in which those embodiments may be implemented. FIG. 1 provides an overview of a scenario 100 in which a vehicle 102 is travelling along a first road 104, only a portion of which is shown in FIG. 1. The first road 104 has two driving lanes: a right-hand lane 106 and a left-hand lane 108. A second road 110 intersects with the right-hand lane 106 and extends perpendicularly to the first road 104. The vehicle 102 is travelling in the right-hand lane 106. The vehicle 102 is travelling from left to right, along a planned trajectory 112. The scenarios and examples described in relation to FIG. 1 are for the purposes of describing the invention only. The techniques described herein may be applied to any interaction between a vehicle and an object.

The vehicle 102 may be an autonomous vehicle. The vehicle 102 may include one or more vehicle systems 114. The vehicle systems 114 may include one or more sensors 116. The sensors 116 may be configured to sense the environment surrounding the vehicle 102. The vehicle systems 114 may also include a computing device 118. The computing device 118 may include a planner 120, a prediction component 122, a processor 124, and a controller 126.

An example vehicle and vehicle system are discussed in more detail in relation to FIG. 2 below.

The vehicle 102 may use its sensors 116 and the planner 120 to determine the trajectory 112. The trajectory 112 may be determined by the planner 120. The trajectory 112 may indicate where the vehicle 102 is going to travel using a path. The trajectory 112 may also indicate a speed at which the vehicle 102 is to travel along the path or other temporal information such as one or more times at which waypoints along the path are to be reached. In other words, the trajectory 112 may represent a vector or a collection of vectors. The trajectory 112 may be determined for a predetermined future time duration. For example, the trajectory 112 may be determined for a period of 5 seconds into the future from the current time. In FIG. 1, the trajectory 112 indicates that the vehicle 102 will travel straight over the duration for which the trajectory 112 has been determined, along the road 104 in the right-hand lane 106. The controller 126 may control one or more drive systems of the vehicle to drive the vehicle 102 along the trajectory 112.

The trajectory 112 may be one trajectory of a plurality of candidate trajectories determined by the planner 120. The planner 120 along with the vehicle systems 114 in general may be configured to perform the techniques described herein to determine a candidate trajectory according to which the vehicle 102 is to be controlled from the plurality of candidate trajectories. The planner 120 may be configured to determine whether the trajectory 112 is the most suitable trajectory for the scenario 100 as opposed to another of the candidate trajectories.

In the scenario 100, another vehicle, which will be referred to as an agent 128, is depicted. Road users other than the vehicle being controlled may generally be referred to as agents. The agent 128 is heading from right to left and is substantially in the left-hand lane 108, but is angled relative to the left-hand lane 108 such that it is partially crossing into the right-hand lane 106. One or more indicator lights of the agent 128 may be flashing, indicating that the agent 128 intends or wishes to cross the right-hand lane 106, although this is not depicted in FIG. 1 for clarity.

The vehicle computing device 118 may be configured to determine a trajectory 130 for the agent 128. The trajectory 130 will be referred to as the agent trajectory 130 to distinguish from trajectory 112. The agent trajectory 130 may be determined based on sensor data gathered by the one or more sensors 116 and relating to the agent 128. The agent trajectory 130 may be determined by the prediction component 122 of the vehicle computing device 118. As with the trajectory 112, the agent trajectory 130 may indicate a path and may associate positions along that path with times within a duration, either by indicating speeds along the path or by other temporal information.

In FIG. 1, the agent trajectory 130 crosses into the right-hand lane in front of the vehicle 102 before entering the second road 110. The agent trajectory 130 crosses the vehicle trajectory 112. In other words, the prediction component 122 of the vehicle computing device 118 predicts that the agent 128 is turning from the left-hand lane 108 to enter the second road 110. The prediction component 122 may base its predictions on one or more parameters or indicators associated with the agent 128.

A process according to techniques described herein may be performed, for example by the vehicle computing device 118 to control the vehicle 102 according to a probability of collision. The vehicle 102 may be controlled to reduce the probability of collision based on the method. The process is depicted pictorially in steps 132 to 136 of FIG. 1.

As shown at step 132, a plurality of time steps may be determined, along with expected positions of the vehicle 102 and the agent 128 along their respective trajectories 112, 130. Four examples of different time steps, at times $t_1$, $t_2$, $t_3$, and $t_4$ are shown in FIG. 1, as indicated in boxes 138, 140, 142, and 144. Each time step may be a predetermined time after the previous time step. For example, time step $t_1$ may be 0.1 seconds from the time shown in scenario 100, and time $t_2$ may be 0.1 seconds after time step $t_1$ and therefore 0.2 seconds from the time shown in scenario 100. The plurality of time steps may include time steps up to the duration of the trajectories.

For each time step, a probability of collision may be determined. Steps 134 and 136 illustrate pictorially how a probability of collision may be determined for time $t_4$ as illustrated in box 144. The process described in relation to time $t_4$ may be repeated for each of the time steps for the duration of the trajectory.

In order to determine a probability of collision, it may be assumed that the vehicle 102 and/or the agent 128 have a degree of error or uncertainty associated with their position. Particularly, because the trajectories 112, 130 represent predictions of future actions of the vehicle 102 and the agent 128, the accuracy of the trajectories 112, 130 may decrease with increasing time into the future. In other words, the position of the vehicle 102 and the agent 128 may be more certain at time $t_1$ than at time $t_2$ and more certain at time $t_2$ than at time $t_3$, and so on. This positional uncertainty may be modelled by representing the position of each of the vehicle 102 and the agent 128 as probability distributions. The probability distributions or functions representing those distributions may indicate, for positions in the environment surrounding the vehicle and the agent, a probability that the agent or the vehicle will be at that particular position at the time step.

In FIG. 1, the probability distributions are depicted in box 134 as ellipses for the purposes of illustration. An ellipse centered on the vehicle 102 is labelled with numeral 146. An ellipse centered on the agent 128 is labelled with numeral 148. The ellipses 146, 148 are centered on respective center points 150, 152 of the vehicle 102 and agents 128 respectively. The ellipses 146, 148 may represent a discrete probability distribution, while in other examples the distributions may be continuous. The distribution for each of the agent and the vehicle may be a Gaussian or normal distribution or an approximation thereof.

In the example of FIG. 1, the ellipses and therefore the respective distributions are symmetrical about the vehicle 102 and the agent 128. In some examples, the distributions may not be symmetrical about the vehicle and/or the agent. For example, where a vehicle is moving in a particular direction, there is more certainty that the vehicle will continue in that direction or at least in a substantially similar direction at a similar velocity, rather than travelling in the opposite direction. For that reason, the distribution may be skewed in the direction of travel of the vehicle or agent. Although the distributions are depicted as 2D distributions in FIG. 1, in some examples the distributions may be determined in 1 or 3 dimensions.

As can be seen in FIG. 1 at box 134, there is some overlap between the ellipses of vehicle 102 and the agent 128 at time $t_4$. In some examples, in order to determine a probability of collision, an amount of overlap may be determined between the distributions representing the vehicle and the agent. In some examples, such as the example of FIG. 1, a combined probability distribution 154 may be determined, as illustrated in box 136. Accordingly, box 134 shows two separate probability distributions 146, 148 representing likely positions of the vehicle 102 and agent 128 at the point in time $t_4$ relative to their expected position from their respective trajectories, while box 136 provides a reframing of the distributions into a single combined distribution 154. The single combined distribution 154 may be considered to represent an expected position of the agent 128 given the position of the vehicle 102 on the trajectory 112. The combined distribution 154 may be considered to represent a transfer of the positional uncertainty from the vehicle to the agent, so that the probability of collision of the vehicle with the agent may be determined, and so that the vehicle can therefore be controlled accordingly. The combined distribution 154 may be considered to be in a different positional space, which is the relative positional space. A combined distribution representing positional uncertainty is determined over a relative position of the agent and the vehicle. The combined distribution 154 may be centered on the agent, and determined as positional uncertainty of the agent relative to the vehicle. The individual distributions and the combined distribution are discussed in more detail in FIG. 4.

The distributions and the combined distribution, although depicted in boxes 134 and 136 as being relative to the vehicle or agent, may be independent of the location within the environment. Instead, the distributions may be determined as being relative to the position on the respective trajectories. In doing so, the distribution for the vehicle and the distribution for the agent in box 134 may be provided on a common scale, and may therefore be combined and/or have operations provided on them. The combined distribution may therefore be an average of the two distributions from box 134.

Subsequently, as depicted in box 136 by arrow 156, a relative position of the vehicle to the agent, i.e., a vector of the vehicle relative to the agent, may be determined. The relative position may be used to evaluate the combined distribution to determine a probability of collision. The value of the distribution at the relative position may be determined. Alternatively, the relative position may be used to determine a plurality of points or a region over which to evaluate the combined distribution for the time step. An example of this is described in relation to FIG. 5.

In some examples, although not shown in FIG. 1, a relative velocity may also be determined and used to evaluate the combined distribution. In some examples, which are also not shown in FIG. 1, a combined area occupied by the vehicle and the agent may be determined and used to evaluate the combined distribution.

A value for a probability of collision may be determined based on the relative position and the combined distribution. The probability of collision value for the time $t_4$ may be combined with probability of collision values from the other time points for the duration of the trajectories 112, 130, to determine an overall probability of collision value. The probability of collision value for each time step may be scaled based on the size of the time step, and may be weighted based on how far into the future the time step is. In some examples, as will be described in relation to FIG. 6, the distributions such as distributions 146, 148 may be scaled to be proportional to the time in the future.

One or more of the probability of collision values, and/or an overall probability of collision value may be used to control the vehicle 102. The vehicle 102 may be controlled to reduce the probability of collision value. The vehicle 102 may be controlled to determine a trajectory from among a plurality of candidate trajectories having a probability of collision value that is below a threshold value or that is the lowest value. The determined trajectory, or the control of the vehicle otherwise may include, as depicted in scenario 158 in FIG. 1, the vehicle 102 decelerating by applying the brakes, illustrated in FIG. 1 by the illumination of brake lights 160. Applying the brakes may cause the vehicle 160 to stop in advance of the path followed by the agent 128. In other examples, the vehicle 102 may be controlled to change lanes if possible or to take other evasive action relative to the agent 128.

Example vehicle systems, such as vehicle systems 112, are shown and described below in more detail in relation to FIG. 2. FIG. 2 illustrates a block diagram of an example system 200 that implements the techniques discussed herein. FIG. 2 may correspond to vehicle systems 114 of FIG. 1. In some instances, the example system 200 may include a vehicle 202, which may correspond to the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification.

The vehicle 202 may include a vehicle computing device (s) 204, sensor(s) 206, emitter(s) 208, network interface(s) 210, and/or drive system(s) 212. The system 200 may additionally or alternatively comprise computing device(s) 232. The vehicle computing device 204 may be configured to perform the method 300 of FIG. 3 described below.

In some instances, the sensor(s) 206 may correspond to sensor(s) 116 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 232.

The vehicle 202 may also include emitter(s) 208 for emitting light and/or sound, such as brake lights 152. The emitter(s) 208 may include interior audio and visual emitter (s) to communicate with passengers of the vehicle 202. Interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 may also include exterior emitter(s). Exterior emitter(s) may include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). The network interface(s) 210 may facilitate communication with other local computing device(s) on the vehicle 202 and/or the drive component(s) 212. The network interface(s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 232 over a network 238. In some examples, computing device(s) 232 may comprise one or more nodes of a distributed computing system (e.g., a cloud computing architecture).

The vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and pre-process data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 214 and memory 216 communicatively coupled with the one or more processors 214. Computing device(s) 232 may also include processor(s) 234, and/or memory 236. The processor(s) 214 and/or 234 may be any suitable processor capable of executing instructions to process data and perform operations as described herein. By way of example and not limitation, the processor(s) 214 and/or 234 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 216 and/or 236 may be examples of non-transitory computer-readable media. The memory 216 and/or 236 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), non-volatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 216 and/or memory 236 may store a perception component 218, localization component 220, planning component 222, map(s) 224, driving log data 226, prediction component 228, and/or system controller(s) 230—zero or more portions of any of which may be hardware, such as GPU(s), CPU(s), and/or other processing units.

The perception component 218 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 218 is referred to as perception data. The perception component 218 may be configured to associate a bounding region (or other indication) with an identified object. The perception component 218 may be configured to associate a confidence score associated with a classification of the identified object with an identified object. In some examples, objects, when rendered via a display, can be colored based on their perceived class. The object classifications determined by the perception component 218 may distinguish between different object types such as, for example, a passenger vehicle, a pedestrian, a bicyclist, motorist, a delivery truck, a semi-truck, traffic signage, and/or the like.

In at least one example, the localization component 220 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 220 may include and/or request/receive map(s) 224 of an environment and can continuously determine a location, velocity, and/or orientation of the autonomous vehicle 202 within the map(s) 224. In some instances, the localization component 220 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 220 may provide data to various components of the vehicle 202 to determine an initial position of an autonomous vehicle for generating a trajectory and/or for generating map data, as discussed herein. In some examples, localization component 220 may provide, to the perception component 218, a location and/or orientation of the vehicle 202 relative to the environment and/or sensor data associated therewith.

The planning component 222 may receive a location and/or orientation of the vehicle 202 from the localization component 220 and/or perception data from the perception component 218 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 230 and/or drive component(s) 212 may parse/cause to be carried out, second instructions for the emitter(s) 208 may be formatted according to a second format associated therewith).

The driving log data 226 may comprise sensor data and perception data collected or determined by the vehicle 202 (e.g., by the perception component 218), as well as any other message generated and or sent by the vehicle 202 during operation including, but not limited to, control messages, error messages, etc. In some examples, the vehicle 202 may transmit the driving log data 226 to the computing device(s) 232. In some examples, the driving log data 226 may comprise (historical) perception data that was generated on the vehicle 202 during operation of the vehicle.

The prediction component 228 may generate one or more probability maps representing prediction probabilities of possible locations of one or more objects in an environment. For example, the prediction component 228 may generate one or more probability maps for vehicles, pedestrians, animals, and the like within a threshold distance from the vehicle 202. In some examples, the prediction component 228 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment. In some examples, the planner component 222 may be communicatively coupled to the prediction component 228 to generate predicted trajectories of objects in an environment. For example, the prediction component 228 may generate one or more predicted trajectories for objects within a threshold distance from the vehicle 202. In some examples, the prediction component 228 may measure a trace of an object and generate a trajectory for the object based on observed and predicted behavior. Although prediction component 228 is shown on a vehicle 202 in this example, the prediction component 228 may also be provided elsewhere, such as in a remote computing device. In some examples, a prediction component may be provided at both a vehicle and a remote computing device. These components may be configured to operate according to the same or a similar algorithm.

The memory 216 and/or 236 may additionally or alternatively store a mapping system, a planning system, a ride management system, etc. Although perception component 218 and/or planning component 222 are illustrated as being stored in memory 216, perception component 218 and/or planning component 222 may include processor-executable instructions, machine-learned model(s) (e.g., a neural network), and/or hardware.

The memory 216 may store one or more prediction models 240 that may be used for trajectory determination or, as described herein, determining turning intention of person-wide vehicles. The one or more prediction models 240 may include, for example, model 140 of FIG. 1.

As described herein, the localization component 220, the perception component 218, the planning component 222, the prediction component 228, the prediction model(s) 240 and/or other components of the system 200 may comprise one or more ML models. For example, the localization component 220, the perception component 218, the planning component 222, the prediction component 228 and/or the prediction model(s) 240 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) 230, which may be configured to control steering, propulsion, braking, safety, emitters, communication, and other systems of the vehicle 202. These system controller(s) 230 may communicate with and/or control corresponding systems of the drive component(s) 212 and/or other components of the vehicle 202.

Figure 2:
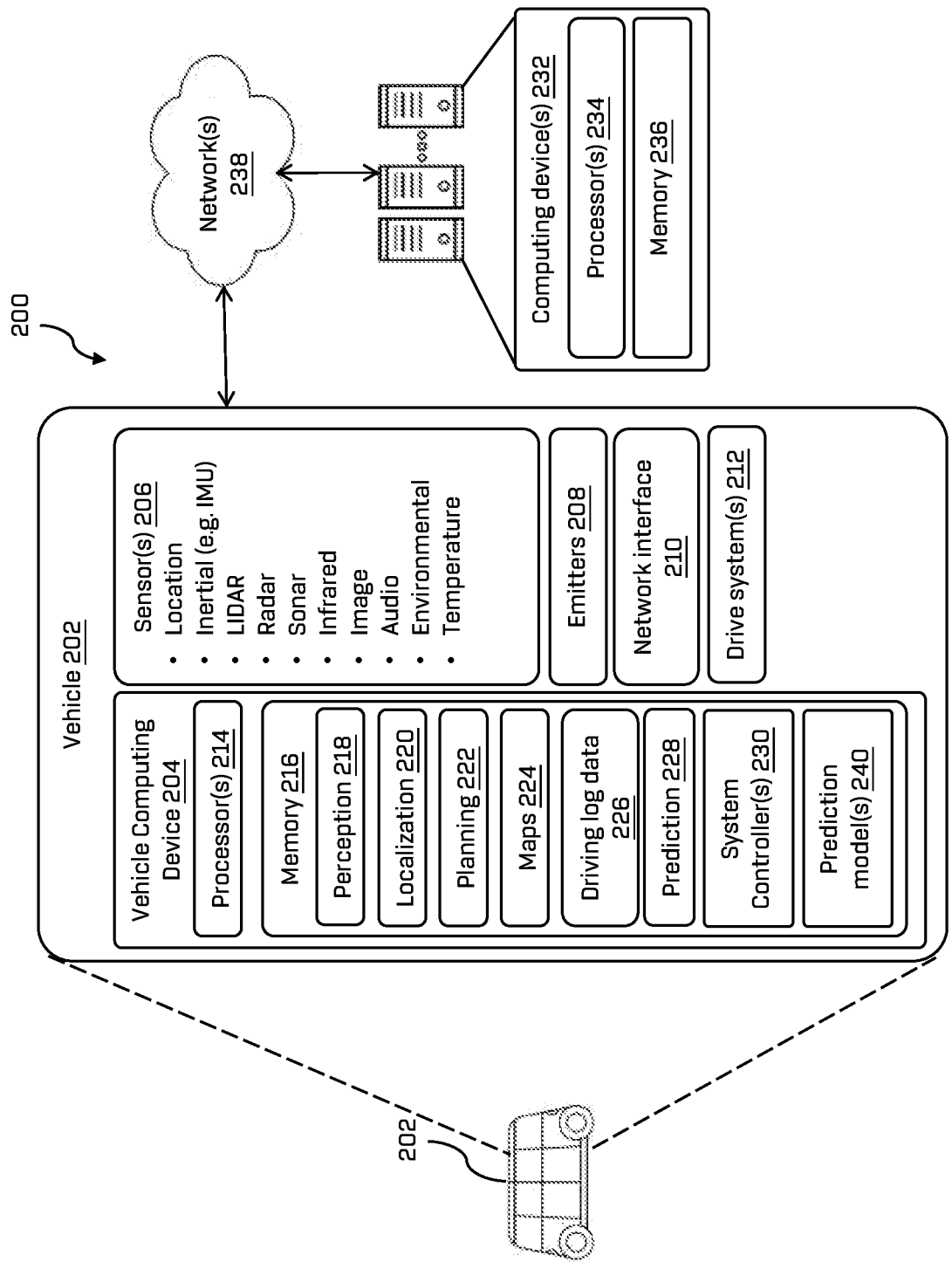
FIG. 2 is a block diagram illustrating an example vehicle system according to the present invention.

It should be noted that while FIG. 2 is illustrated as a distributed system, in alternative examples, components of the vehicle 202 may be associated with the computing device(s) 232 and/or components of the computing device(s) 232 may be associated with the vehicle 202. That is, the vehicle 202 may perform one or more of the functions associated with the computing device(s) 232, and vice versa.

Figure 3:
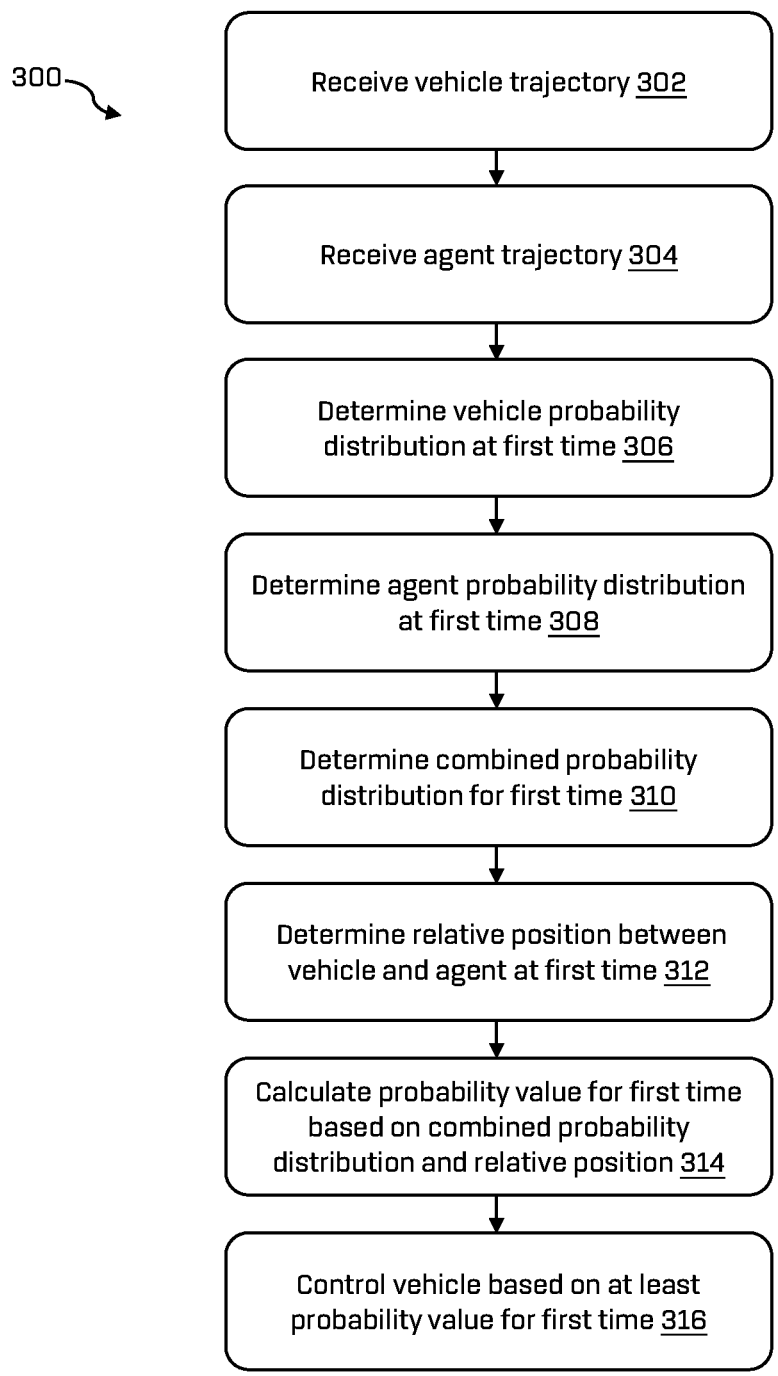
FIG. 3 depicts a flow chart of a process for controlling a vehicle based on a probability of collision according to the present invention.

FIG. 3 provides an exemplary flow chart that describes a generalized method 300 corresponding to the example described above with reference to FIG. 1. The method 300 may be performed by an autonomous vehicle, such as vehicle 102 or 202, and specifically by a vehicle computing device, such as computing device 118 or 204. The steps of FIG. 3 may include other features as described in relation to other figures or examples described herein.

In FIG. 3, the method 300 may comprise, at step 302, receiving a trajectory for a vehicle. For example, a trajectory 112 may be received for vehicle 102 as in FIG. 1. The trajectory may be received from a planner component of the vehicle. The trajectory may be a trajectory from a plurality of candidate trajectories. The trajectory may be a current trajectory.

At step 304, the method 300 may comprise receiving a trajectory for an agent, such as trajectory 130 of agent 128 in FIG. 1. The trajectory may be received from a prediction component of the vehicle. The trajectories may indicate vector information, such as a path and velocity at one or more positions along the path, for the vehicle and the agent respectively.

The trajectories for the agent and vehicle may be determined over a predetermined future duration. The trajectories may be divided into a plurality of time steps. Each time step may have a predetermined duration. Steps 306 to 314 may be performed for at least one of the time steps, and will be described below as being performed for a first time step, which may be referred to as a first time or first time point. In some examples, steps 306 to 314 may be performed for more than one time step, or all time steps, over the duration of the trajectories. The vehicle and the agent each have a first associated position on their respective trajectories at each time step. The steps of the method 300 may be performed at a current time, before the time steps over which the trajectories are predicted or planned.

At step 306, the method 300 may comprise determining a vehicle probability distribution for the vehicle at the first time along its trajectory, when the vehicle is at a first position on its trajectory. At step 308, the method 300 may comprise determining an agent probability distribution for the agent at the first time along its trajectory, when the agent is at a first position on its trajectory. The probability distributions may be defined by a probability density function. The probability distributions may be Gaussian distributions.

The probability distributions may be specific to the vehicle or the agent. For example, because the vehicle's expected trajectory is more certain than the agent's predicted trajectory by virtue of the vehicle being known to be being controlled based on the trajectory whereas it is not known what trajectory the agent is following and can therefore only be predicted, the vehicle's probability distribution may have a smaller standard deviation than the distribution of the agent. In some examples, the probability distributions may be based on a velocity of the entity for which they are determined. The velocity may be a longitudinal velocity or a lateral velocity or a combination thereof. The probability distributions may be based on the type of agent. For example, a different probability distribution may be determined for a bicycle than for a pedestrian or car travelling along similar paths because the underlying mechanics of movement of these agents differ. The probability distributions may be determined based on a model of the dynamics of an agent or vehicle. The probability distributions may be based on a state of the agent or vehicle, as defined by one or more of the vehicle systems. The state of an agent may include information relating to at least one of an entity type, a direction of travel, a trajectory, a current position, a behavior profile, whether the agent is being controlled manually or autonomously, whether the agent is static or in motion, or environmental conditions.

The probability distributions may be determined relative to a center of the vehicle and the agent. In other words, the distributions may be defined for relative distances and directions from the center of the vehicle and agent. Accordingly, in examples the mean of each distribution may be centered at zero, and the distributions may be provided on a common scale.

At step 310, the method 300 may comprise determining a combined probability distribution for the first time based on the vehicle probability distribution and the agent probability distribution. Combining probability distributions may comprise summing the vehicle probability distribution and the agent probability distribution. Where the agent and vehicle probability distributions are Gaussian distributions, the combined probability distribution may be considered to be a sum of two normally distributed, random variables. The resulting combined probability distribution may itself be a random variable with a Gaussian distribution. Combinations of probability distributions is described below in more detail in relation to FIG. 4.

At step 312, the method 300 may comprise determining a relative position between the vehicle and agent at the first time. The relative position may comprise a relative distance and a relative direction that may be comparable with the combined distribution. In other words, the relative position may be determined relative to the vehicle and/or agent in the same way as the probability distributions from steps 306 and 308.

Based on the relative position and the combined probability distribution, a probability value for the first time may be determined at step 314. The combined probability distribution may be evaluated using the relative position. In other examples, as will be described in relation to FIG. 5, the relative position may be used to determine a range of values over which the distribution may be evaluated and integrated, to account for relative dimensions of the vehicle and/or agent. The relative position may also be used together with velocity data, such as a relative velocity, to account for relative movement between the vehicle and the agent over the duration of a time step. The probability value may represent a probability of collision between the vehicle and the agent at the first time.

At step 316, the vehicle may be controlled based on the probability value. In some examples, steps 306 to 314 may be performed for each of a plurality of time steps, thereby providing a plurality of probability values. The probability values may be used to determine a further value, which may represent an overall probability of collision or a cost value. Each of the probability values may be weighted according to its time relative to the current time. Times further into the future may be weighted less, so as to account for time uncertainty. Alternatively, or additionally, the probability values may be used to determine a function. Each of the values may be determined and collected as part of a function. Weightings and other scaling factors, such as to account for time uncertainty, may be applied to the function. The function may be evaluated to determine a cost value according to which the vehicle may be controlled. A cost function or value may be used to determine a trajectory from among a plurality of candidate trajectories for use in controlling the vehicle.

Figure 4:
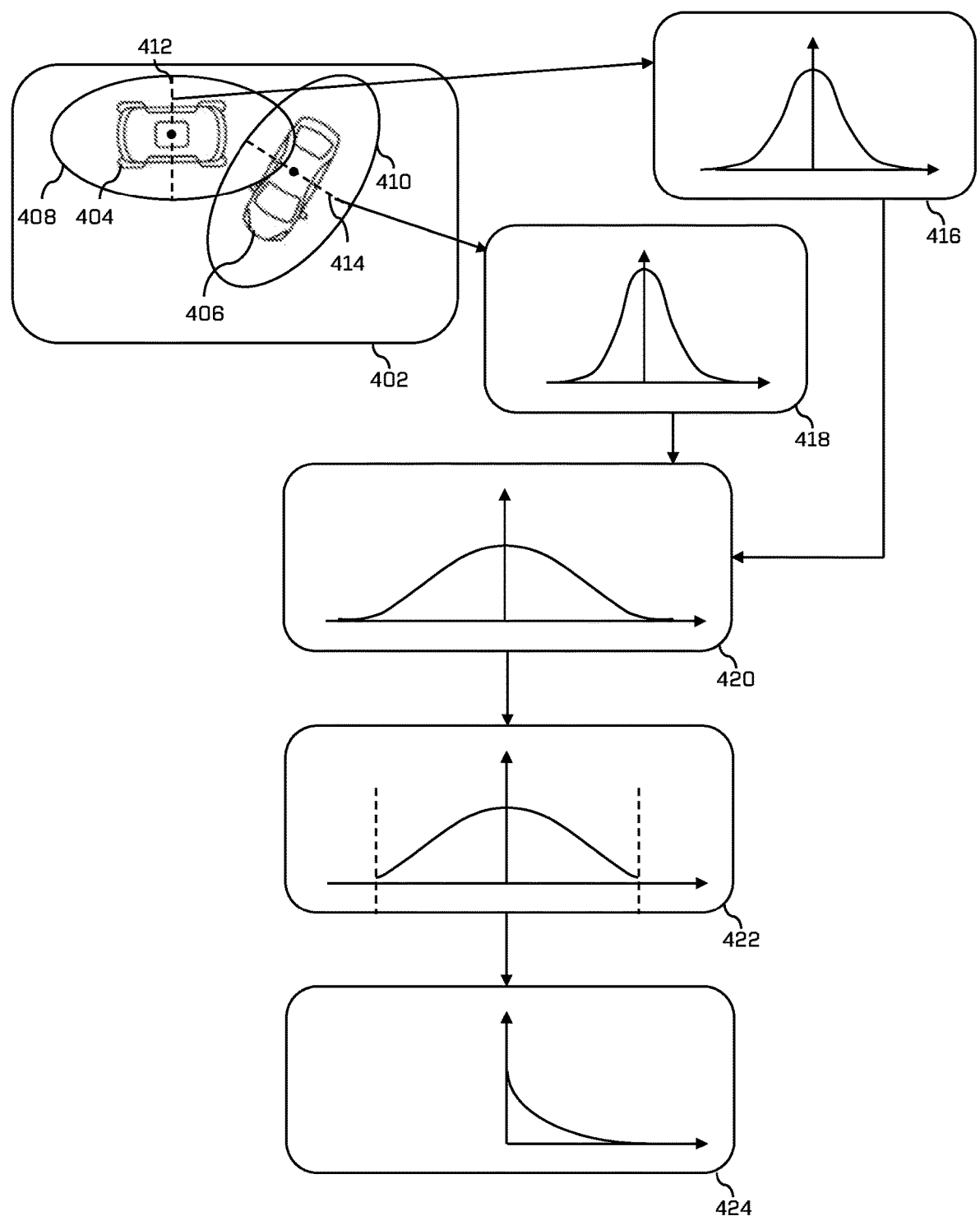
FIG. 4 is a schematic diagram illustrating how a combined probability distribution may be determined according to the present invention.

FIG. 4 illustrates how two probability distributions may be combined and approximated for subsequent evaluation using a relative position. FIG. 4 shows, in box 402, which is similar to what is shown in box 134 in FIG. 1. In box 402, a vehicle 404 and agent 406 are shown at a future time step along respective trajectories. The vehicle 404 may have an associated distribution, represented by ellipse 408, and the agent 406 may have an associated distribution, represented by ellipse 410. For the purposes of explaining the combination and approximation of the distributions 408, 410, a line 412, 414 across the center of each ellipse is provided, for which a representative 2D distribution along the lines 412, 414 is shown in boxes 416 and 418 respectively. The distributions in boxes 416, 418 may be Gaussian distributions, and in this example are considered to be continuous distributions.

The distributions, such as 416 and 418, may be defined as a function of a state of the entity to which they refer. For example, a distribution may be defined as a function of velocity in each dimension for which the distribution is being determined. An example equation for determining a standard deviation for a distribution in the x direction may be:

$$\sigma_{px} = c_1 v(x) + c_2$$

where $\sigma_{px}$ is the standard deviation in the x direction relative to the vehicle or agent, $c_1$ and $c_2$ are constants and $v(x)$ is velocity at the position x. A standard deviation in the y direction may also be determined using a similar equation, where the constants are different. In some examples, standard deviation in the y direction may be based on a lateral velocity rather than the velocity of the entity in the x direction. While a first order equation is provided for standard deviation above, in some examples more complex equations may be provided, representing and including other parameters relating to the state of an entity. Uncertainty in the state of an entity may be incorporated using an affine function.

As described in FIG. 3, at step 310, the distributions 416, 418 may be combined to form a combined distribution 420. The combined distribution 420 may be a sum of the two individual distributions 416, 418 over a relative positional space.

Having determined a combined distribution 420, the combined distribution 420 may be converted from a continuous function to a discrete function by determining a confidence ellipse or a limit around the distribution, as indicated in box 422 by the dashed lines 424. The limit or confidence ellipse may be set as a 3-sigma limit, i.e., it represents three times the standard deviation of the distribution in a particular direction. The standard deviations in the x and y directions, or more particularly three times the standard deviations in those directions, may therefore be used to define the ellipse. Other limit levels may be set. Determining a limit avoids probabilities that are too low to warrant consideration being used as part of the method, so as to avoid unnecessary calculations. Relative positions outside of the limit or confidence ellipse may therefore return a probability of zero, while inside the limit or confidence ellipse, the value may correspond to the value of the distribution. In some examples, a continuous distribution may be converted to a discrete distribution in one or more other ways.

Having converted the distribution, or separately from the conversion, the combined distribution may be approximated to a quadratic function, as shown in box 424. The quadratic function may define a probability in a particular direction between the center point about which the combined distribution is centered and the edge of the ellipse. An example equation for defining a quadratic equation defining a probability distribution is:

$$p(e_r(t)) = \begin{cases} \frac{6}{\pi b_x(t) b_y(t)} \left(1 - \frac{\|e_r(t)\|}{b(t)}\right)^2, & 0 \le \|e_r(t)\| \le b(t) \\ 0, & \text{else} \end{cases}$$

where $e_r$ is the position error, $b_x$ and $b_y$ are the principal radii of the ellipse (and therefore may be 3 times the standard deviation or other metric used to determine the confidence ellipse), and $b(t)$ is the radius of the ellipse along the direction of $e_r(t)$.

Approximating the value to a quadratic function may provide a simplified version of the distribution that still has a shape resembling the distribution that may be used to determine a probability of collision. While FIG. 4 illustrates these principles along a line and therefore in a single dimension, it will be appreciated that the same may be applied to 2- or 3-dimensional distributions.

Having determined a combined distribution, a converted combined distribution, an approximate combined distribution, or a combination thereof, as in FIG. 4, further analysis may be performed to provide greater accuracy in determining the probability of collision. Such analysis may be considered with reference to FIG. 5, which describes how shape and/or size, as well as relative velocity of the agent and hero may be used to provide a probability of collision at a particular time step.

Figure 5:
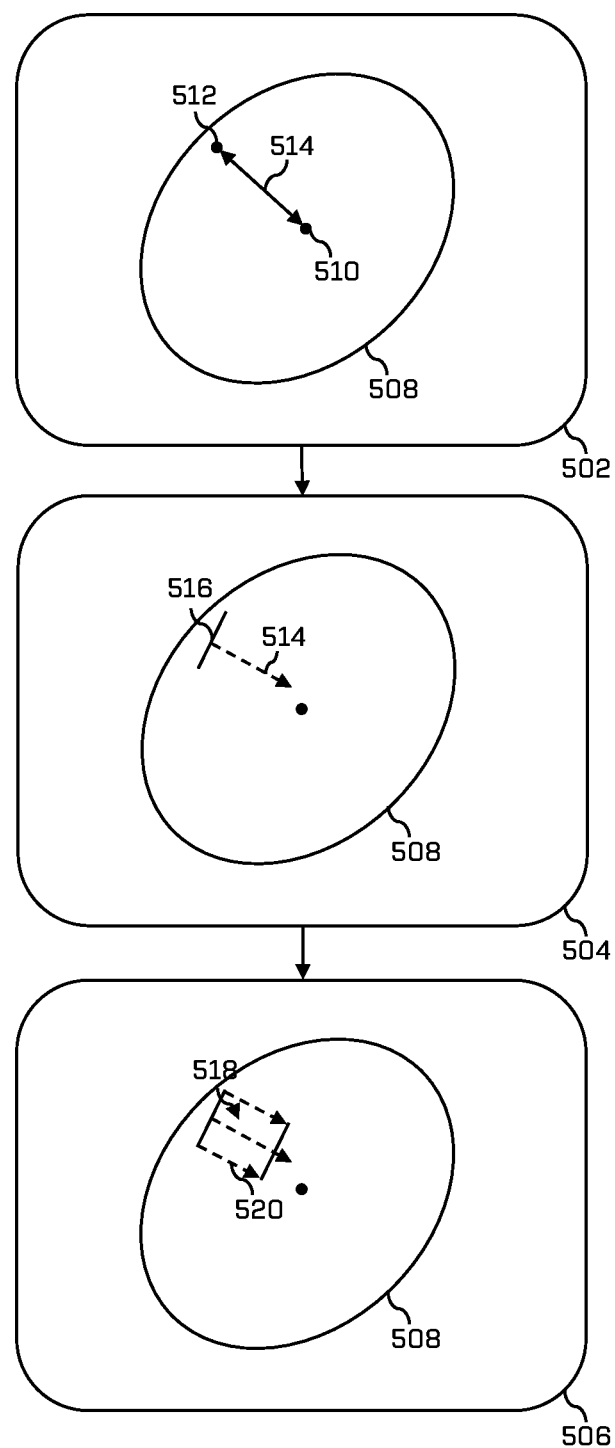
FIG. 5 is a schematic diagram illustrating how a probability of collision may be determined over a time step according to the present invention.

FIG. 5 illustrates, in box 502, an ellipse 508 representing a combined distribution. The combined distribution is in this representation centered around a first position 510 of an agent on an agent trajectory. A first position 512 of a vehicle relative to the agent position 510, which, for the purpose of evaluating the combined distribution is considered to be fixed for the time step, is also shown. The vehicle and agent are not represented for the purposes of clarity. The first positions 510, 512 may be determined for a time step. The combined distribution may have been determined according to the techniques above, such as in relation to FIG. 1, 3, or 4.

As shown in box 502 by arrow 514, a relative position may be determined between the agent and the vehicle. The relative position may be determined between the first positions 510, 512, as shown in box 502. The first positions 510, 512 may represent center points of the vehicle and agent respectively. In some examples, the relative position may be determined between a portion or point on the vehicle or agent or a representation thereof.

The combined distribution or a function describing it may be evaluated using the relative position to determine a probability of collision between the vehicle and the agent for the time step being considered. This may provide a good approximation to the probability of collision, although may not account for certain parameters associated with the vehicle and agent, such as their sizes and shapes or how they travel over the time steps. Taking account of these features may lead to increased accuracy of the determination of a probability of collision. In some examples, the time steps may be shortened, i.e., more time steps are taken along the trajectory, to increase how many probabilities are determined. This technique may allow more precise movements of the vehicle and agent to be taken into account.

Additionally, or alternatively, techniques may be employed to take account of movements and sizes/shapes of the vehicle and agent within a time step. Performing these techniques, which are described below in relation to boxes 504 and 506 of FIG. 5, may provide accurate determinations of probability of collision without high computational burden. The techniques may allow the trajectories to be split into fewer time steps, thereby avoiding long computation times and costs. This may be particularly useful when applied in a moving vehicle for which the determinations it makes are critical to safety.

As in FIGS. 1 and 4, the vehicle may be travelling along a straight trajectory from left to right while the agent may be travelling diagonally across the straight trajectory of the agent. In order to take account of a size of the vehicle and the agent, an area that may be occupied by the vehicle and agent together may be used to evaluate the combined distribution. This may be achieved by determining dimensions of the vehicle and the agent together. The area may be based on a projection of the vehicle and agent along their respective paths as defined by their trajectories and determining a region in which the projections touch or overlap.

A relative trajectory or velocity vector 514 may also be determined. The relative trajectory or velocity vector may be determined between the vehicle and the agent by subtracting, e.g. the velocity vector of the agent from the velocity vector of the vehicle. The velocity vector or trajectory may indicate a relative direction of travel, over which an area or dimension of the vehicle, agent, or combination may be integrated to determine a probability of collision over the area occupied by the vehicle and/or agent. This interval, representing a range of positions occupied by the vehicles is represented by a line 516 in box 504 in FIG. 5.

In order to take account of a relative distance travelled by the vehicle and the agent over a given time step, the interval, represented by line 516 in box 504, may be used to define a region representing a relative movement of the vehicle and agent. The region may be then used to determine a probability of collision over the time step. A relative velocity vector may be determined between the vehicle and the agent. A relative velocity magnitude may be determined based on the relative velocity vector. As represented in box 506, the interval may be swept into a region 518, i.e., converted from line 516 to region 518, over which the combined distribution is evaluated. This may be performed by multiplying the integral along the line by the relative velocity magnitude, represented in box 506 by arrows 520.

By performing these steps for each of the time steps, the relative movements of the vehicle and agent may be taken into account when determining the probability of collision for each time step, and over the entire trajectories. In doing so, a more accurate determination may be made. Greater accuracy in such determinations may allow for more nuanced and improved control of the vehicle, and/or improved safety due to the improved understanding of the risks to the vehicle posed by the agent.

Figure 6:
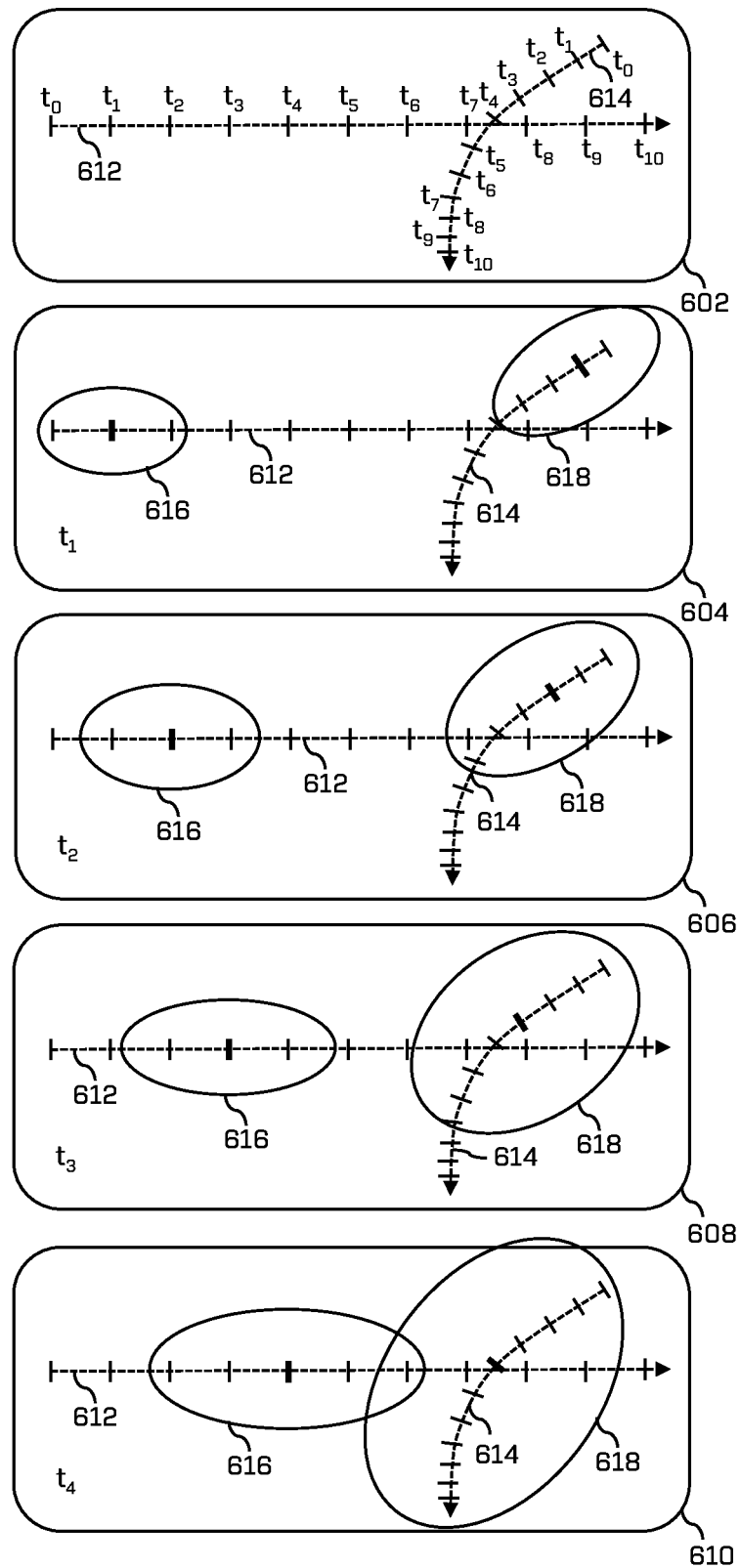
FIG. 6 is a schematic diagram representing how probabilities of collision are determined for a plurality of time steps according to the present invention.

FIG. 6 illustrates how uncertainty may increase with increasing time. Positional uncertainty may be indicated using the probability distribution for each of the vehicle and agent for a particular time step. The probability distributions may change for each time step to account for increasing uncertainty as the trajectories are followed further into the future. Time uncertainty may be introduced into a probability of collision determination or a cost determination based on a plurality of probabilities. The time uncertainty may be introduced by changing the distributions, and particularly by changing a standard deviation of the distributions to increase with increasing time. In some examples, a standard deviation of a distribution for the vehicle or the agent may be proportional to the time since the current time.

To illustrate this, FIG. 6 shows five boxes, 602 604, 606, 608, 610. In box 602, a trajectory 612 for a vehicle and a trajectory 614 for an agent are shown. These trajectories are substantially similar to the trajectories 112 and 130 shown in FIG. 1. The trajectories 612, 614 have the same duration. In some examples, the trajectories may have different durations, and a part of the longer trajectory that has the same duration as the shorter trajectory may be selected. As shown in box 602, the trajectories 612, 614 may start at a current time, to. The trajectories 612, 614 may be subdivided into the same number of time steps. Each time step may have the same or different duration. In FIG. 6, trajectories 612, 614 are divided into ten time steps, $t_1$ to $t_{10}$. For a vehicle such as vehicle 102 that is travelling at constant velocity, the time steps of the trajectory 612 are equally spaced. For an agent such as agent 128 that accelerates to begin with and slows down later in the trajectory, time steps $t_1$ to $t_3$ are spaced apart more than later time steps, where the deceleration means that the agent travels less distance during those time steps.

Boxes 604 to 610 depict examples of how probability distributions may change over time for the vehicle and agent. Box 604 depicts time step $t_1$, box 606 depicts time step $t_2$, box 608 depicts time step $t_3$, and box 610 depicts time step $t_4$. In each box, a probability distribution is depicted for the vehicle along trajectory 612 as a vehicle ellipse 616, and a probability distribution is depicted for the agent along the trajectory 614 as an agent ellipse 618. The ellipses 616, 618 may be considered to represent the 3-sigma limit, for the purpose of illustration, although the distributions may be continuous functions.

In box 604, the ellipses are relatively small, meaning that the positional uncertainty of the vehicle and agent is low. This is because the time $t_1$ for which these distributions are determined is only one time step into the future, meaning that the position of the vehicle and agent is not expected to change a lot relative to the current positions. The agent ellipse 618 may be bigger, i.e., its standard deviation may be larger, indicating that there is greater positional uncertainty about the agent's position. This may be because the agent's trajectory may be being predicted, whereas the vehicle trajectory may be being planned.

As the time increases, from $t_1$ to $t_4$ through boxes 604 to 610, the size of the ellipses 616, 618 may increase. This is because there is greater uncertainty due to increasing time at later time steps. The size of the ellipses 616, 618 may increase in length, due to there being greater positional uncertainty associated with the movement of the vehicle or agent in the direction of travel. In the example of FIG. 6, the ellipse 616 may increase in length to a greater extent than it increases in width, because the trajectory indicates straight travel with no lateral velocity. Where a trajectory indicates lateral movement, such as a vehicle or agent turning, there may be positional uncertainty in both the direction of travel and to either side of the vehicle or agent. An example of this is shown in the changing of the size of the ellipse 618 of FIG. 6 in both width and length between boxes 604 and 610.

In some examples, the distributions, and particularly their standard distributions, may be proportional to the time in the future. In some examples, the standard distributions may be based on one or more other parameters of the vehicle or agent. For example, a velocity and/or a direction of travel of the agent or vehicle may be determined based on the trajectory and used to determine a distribution for the vehicle or agent.

Example Clauses

A: A system comprising one or more processors; and non-transitory memory storing processor-executable instructions that, when executed by the one or more processors, cause the system to perform actions including: receiving, from a planning component of an autonomous vehicle, a candidate trajectory for the autonomous vehicle to traverse an environment; receiving, from a prediction component of the autonomous vehicle, a predicted trajectory for an object in the environment; determining a planned position for the autonomous vehicle along the candidate trajectory at a future time; determining a vehicle probability function for the autonomous vehicle at the future time, the vehicle probability function representing a positional uncertainty associated with the planned position; determining a predicted position for the object along the predicted trajectory at the future time; determining an object probability function for the object at the future time, the object probability function representing a positional uncertainty associated with the predicted position; combining the vehicle probability function and the object probability function into a combined probability function, the combined probability function representing a total positional uncertainty between the planned position and the predicted position; determining a relative position based at least in part on the planned position and the predicted position; determining a value from the combined probability function based at least in part on the relative position, the value representing a probability of collision between the autonomous vehicle and the object at the at least one future time; and controlling the autonomous vehicle based at least in part on the value.

B: a system as clause A describes, wherein the actions further include: determining a further planned position for the autonomous vehicle along the candidate trajectory at a further future time; determining a further vehicle probability function for the autonomous vehicle at the further future time, the further vehicle probability function representing a positional uncertainty associated with the further planned position; determining a further predicted position for the object along the predicted trajectory at the further future time; determining a further object probability function for the object at the further future time, the further object probability function representing a positional uncertainty associated with the further predicted position; combining the further vehicle probability function and the further object probability function into a further combined probability function, the further combined probability function representing a total positional uncertainty between the further planned position and the further predicted position; determining a further relative position based at least in part on the further planned position and the further predicted position; determining a further value from the further combined probability function based at least in part on the further relative position, the further value representing a probability of collision between the autonomous vehicle and the object at the further future time; and determining a cost value based at least in part on the further value and the value, wherein the autonomous vehicle is controlled based at least in part on the cost value.

C: a system as clause A or clause B describe, wherein the actions further include: determining a parameter associated with the relative position, the parameter comprising at least one of a dimension of the vehicle, a shape of the vehicle, a dimension of the agent, a shape of the agent, or a relative velocity magnitude of the vehicle relative to the agent, wherein the value is determined from the combined probability function based at least in part on the at least one parameter.

D: a system as any of clauses A to C describe, wherein the autonomous vehicle is controlled to perform at least one of: decelerating in advance of the planned position; follow a different trajectory to the planned trajectory; emit a warning to the object and/or one or more other road users; emit a warning to one or more occupants of the autonomous vehicle; send a request for teleoperation to a teleoperator; perform a safe stop maneuver.

E: a system as any of clauses A to D describe, wherein the vehicle probability distribution and the object probability distribution comprise a normal distribution.

F: a system as any of clauses A to E describe, wherein the combined probability distribution comprises a sum of the vehicle probability distribution and the object probability distribution.

G: a method comprising: receiving a first vehicle trajectory associated with a vehicle in an environment; receiving a first object trajectory associated with an object in the environment; determining a first vehicle probability distribution associated with the vehicle at a first time along the first vehicle trajectory; determining a first object probability distribution associated with the object at the first time along the first object trajectory; determining a first combined probability distribution based at least in part on the first vehicle probability distribution and the first object probability distribution; determining a first relative position between the vehicle and the object at the first time based at least in part on the first vehicle position and the first object position; determining a first probability value based at least in part on the first combined probability distribution and the first relative position; and controlling the vehicle based at least in part on the first probability value.

H: a method as clause G describes, wherein the first vehicle probability distribution, the first object probability distribution, and the first combined probability distribution comprise Gaussian distributions.

I: a method as clause G or clause H describe, wherein the first combined probability distribution is determined based at least in part on a sum of the first vehicle probability distribution and the first object probability distribution.

J: a method as any of clauses G to I describe, comprising determining a first quadratic approximation of the first combined probability distribution, wherein the first probability value is determined based at least in part on the first quadratic approximation.

K: a method as any of clauses G to J describe, comprising determining a confidence ellipse based at least in part on the first combined probability distribution.

L: a method as clause K describes, comprising one or more of: determining that the first relative position is outside of the confidence ellipse, wherein the first probability value is calculated to be zero based at least in part on the first relative position being outside of the confidence ellipse; or determining that the first relative position is inside the confidence ellipse, wherein the first probability value is calculated based at least in part on the value of the first combined probability distribution at the first relative position.

M: a method as any of clauses G to L describe, wherein the first combined probability distribution is determined over a relative positional space between the first vehicle and the first object.

N: a method as any of clauses G to M describe, comprising: determining a range of relative positions for the vehicle based at least in part on a dimension of at least one of the vehicle or the object, the range of relative positions including the first relative position, wherein the first probability value is calculated over the range of relative positions.

O: a method as any of clauses G to N describe, comprising: determining a first vehicle velocity associated with the vehicle at the first time based at least in part on the first vehicle trajectory; determining a first object velocity associated with the object at the first time based at least in part on the first object trajectory; and determining a first relative velocity between the vehicle and the object based at least in part on the first vehicle velocity and the first object velocity, wherein the first probability value is calculated based at least in part on the first relative velocity.

P: a method as any of clauses G to O describe, comprising: determining a second vehicle probability distribution associated with the vehicle at a second time along the first vehicle trajectory; determining a second object probability distribution associated with the object at the second time along the first object trajectory; determining a second combined probability distribution based at least in part on the second vehicle probability distribution and the second object probability distribution; determining a second relative position between the vehicle and the object at the second time based at least in part on the second vehicle position and the second object position; and determining a second probability value based at least in part on the second combined probability distribution and the second relative position, wherein the vehicle is controlled based at least in part on the second probability value.

Q: a method as any of clauses G to P describe, comprising: determining an overall cost value associated with the first trajectory, the overall cost value being calculated based at least in part on the first probability value and the second probability value.

R: a method as clause Q describes, comprising: determining a first cost value based at least in part on the first probability value and a first weighting; and determining a second cost value based at least in part on the second probability value and a second weighting, wherein the overall cost value is determined based at least in part on the first cost value and the second cost value.

S: a method as clause R describes, wherein the first weighting is greater than or equal to the second weighting.

T: a method as any of clauses G to S describe, comprising: receiving a further vehicle trajectory associated with the vehicle in the environment; determining a further vehicle probability distribution associated with the vehicle at the first time along the further vehicle trajectory; determining a further combined probability distribution based at least in part on the further vehicle probability distribution and the first object probability distribution; determining a further relative position between the vehicle and the object at the first time based at least in part on the further vehicle position and the first object position; determining a further probability value based at least in part on the further combined probability distribution and the further relative position; and determining a particular trajectory of the first vehicle trajectory and the further vehicle trajectory based on the first probability value and the further probability value, wherein the vehicle is controlled according to the particular trajectory.

U: a method as any of clauses G to T describe, wherein the first vehicle probability distribution, the first object probability distribution, and the first combined probability distribution comprise Gaussian distributions, wherein the first combined probability distribution is determined based at least in part on a sum of the first vehicle probability distribution and the first object probability distribution, and wherein the method comprises: determining a confidence ellipse based at least in part on the first combined probability distribution; and determining a first quadratic approximation of the first combined probability distribution, wherein the first probability value is determined based at least in part on the first quadratic approximation and the confidence ellipse.

V: a system comprising: one or more processors; and non-transitory memory storing processor-executable instructions that, when executed by the one or more processors, cause the system to perform actions as described by the method of any of clauses G to U.

W: one or more non-transitory computer-readable media storing instructions executable by one or more processors, wherein the instructions, when executed, cause the one or more processors to perform operations as described by the method of any of clauses G to U.

While the example clauses described above are described with respect to one particular implementation, it should be understood that, in the context of this document, the content of the example clauses can also be implemented via a method, device, system, computer-readable medium, and/or another implementation. Additionally, any of examples A-W may be implemented alone or in combination with any other one or more of the examples A-W.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
non-transitory memory storing processor-executable instructions that, when executed by the one or more processors, cause the system to perform actions including:
receiving, from a planning component of an autonomous vehicle, a planned trajectory for the autonomous vehicle to traverse an environment;
receiving, from a prediction component of the autonomous vehicle, a predicted trajectory for an object in the environment;
determining a planned position for the autonomous vehicle along the planned trajectory at a future time;
determining a vehicle probability function for the autonomous vehicle at the future time, the vehicle probability function representing a positional uncertainty associated with the planned position;
determining a predicted position for the object along the predicted trajectory at the future time;
determining an object probability function for the object at the future time, the object probability function representing a positional uncertainty associated with the predicted position;
combining the vehicle probability function and the object probability function into a combined probability function, the combined probability function representing a total positional uncertainty between the planned position and the predicted position;
determining a relative position based at least in part on the planned position and the predicted position;
determining a value from the combined probability function based at least in part on the relative position, the value representing a probability of collision between the autonomous vehicle and the object at the at least one future time;

determining a further value based at least in part on a further planned position for the autonomous vehicle along the planned trajectory, the further value representing a probability of collision associated with the further planned position;

determining a cost value based at least in part on the value and the further value; and controlling the autonomous vehicle based at least in part on the cost value.

2. The system of claim 1, wherein the actions further include:

determining the further planned position for the autonomous vehicle along the planned trajectory at a further future time;

determining a further vehicle probability function for the autonomous vehicle at the further future time, the further vehicle probability function representing a positional uncertainty associated with the further planned position;

determining a further predicted position for the object along the predicted trajectory at the further future time;

determining a further object probability function for the object at the further future time, the further object probability function representing a positional uncertainty associated with the further predicted position;

combining the further vehicle probability function and the further object probability function into a further combined probability function, the further combined probability function representing a total positional uncertainty between the further planned position and the further predicted position;

determining a further relative position based at least in part on the further planned position and the further predicted position; and determining the further value from the further combined probability function based at least in part on the further relative position, the further value representing a probability of collision between the autonomous vehicle and the object at the further future time.

3. The system of claim 1, wherein the actions further include:

determining a parameter associated with the relative position, the parameter comprising at least one of a dimension of the vehicle, a shape of the vehicle, a dimension of the object, a shape of the object, or a relative velocity magnitude of the vehicle relative to the object, wherein the value is determined from the combined probability function based at least in part on the at least one parameter.

4. The system of claim 1, wherein the autonomous vehicle is controlled to perform at least one of:

decelerating in advance of the planned position;

follow a different trajectory to the planned trajectory;

emit a warning to the object and/or one or more other road users;

emit a warning to one or more occupants of the autonomous vehicle;

send a request for teleoperation to a teleoperator; or perform a safe stop maneuver.

5. The system of claim 1, wherein the vehicle probability function and the object probability function comprise a normal distribution, and wherein the combined probability function comprises a sum of the vehicle probability function and the object probability function.

6. A method comprising:

receiving a first vehicle trajectory associated with a vehicle in an environment;

receiving a first object trajectory associated with an object in the environment;

determining a first vehicle probability distribution associated with the vehicle at a first time along the first vehicle trajectory;

determining a first object probability distribution associated with the object at the first time along the first object trajectory;

determining a first combined probability distribution based at least in part on the first vehicle probability distribution and the first object probability distribution;

determining a first relative position between the vehicle and the object at the first time based at least in part on the first vehicle position and the first object position;

determining a first probability value based at least in part on the first combined probability distribution and the first relative position;

determining a second probability value associated with the vehicle at a second time along the first vehicle trajectory;

determining a cost associated with the first probability value and the second probability value; and controlling the vehicle based at least in part on the cost.

7. The method of claim 6, wherein the first vehicle probability distribution, the first object probability distribution, and the first combined probability distribution comprise Gaussian distributions, and wherein the first combined probability distribution is determined based at least in part on a sum of the first vehicle probability distribution and the first object probability distribution.

8. The method of claim 7, comprising:

determining a first quadratic approximation of the first combined probability distribution, wherein the first probability value is determined based at least in part on the first quadratic approximation.

9. The method of claim 7, comprising:

determining a confidence ellipse based at least in part on the first combined probability distribution; and one or more of:
determining that the first relative position is outside of the confidence ellipse, wherein the first probability value is calculated to be zero based at least in part on the first relative position being outside of the confidence ellipse; or determining that the first relative position is inside the confidence ellipse, wherein the first probability value is calculated based at least in part on the value of the first combined probability distribution at the first relative position.

10. The method of claim 6, wherein the first combined probability distribution is determined over a relative positional space between the first vehicle and the first object.

11. The method of claim 6, comprising:

determining a range of relative positions for the vehicle based at least in part on a dimension of at least one of the vehicle or the object, the range of relative positions including the first relative position, wherein the first probability value is calculated over the range of relative positions.

12. The method of claim 6, comprising:

determining a first vehicle velocity associated with the vehicle at the first time based at least in part on the first vehicle trajectory;

determining a first object velocity associated with the object at the first time based at least in part on the first object trajectory; and determining a first relative velocity between the vehicle and the object based at least in part on the first vehicle velocity and the first object velocity, wherein the first probability value is calculated based at least in part on the first relative velocity.

13. The method of claim 6, comprising:

determining a second vehicle probability distribution associated with the vehicle at the second time along the first vehicle trajectory;

determining a second object probability distribution associated with the object at the second time along the first object trajectory;

determining a second combined probability distribution based at least in part on the second vehicle probability distribution and the second object probability distribution;

determining a second relative position between the vehicle and the object at the second time based at least in part on the second vehicle position and the second object position; and determining the second probability value based at least in part on the second combined probability distribution and the second relative position, wherein the vehicle is controlled based at least in part on the second probability value.

14. One or more non-transitory computer-readable media storing instructions executable by one or more processors, wherein the instructions, when executed, cause the one or more processors to perform operations comprising:

receiving a first vehicle trajectory associated with a vehicle in an environment;

receiving a first object trajectory associated with an object in the environment;

determining a first vehicle probability distribution associated with the vehicle at a first time along the first vehicle trajectory;

determining a first object probability distribution associated with the object at the first time along the first object trajectory;

determining a first combined probability distribution based at least in part on the first vehicle probability distribution and the first object probability distribution;

determining a first relative position between the vehicle and the object at the first time based at least in part on the first vehicle position and the first object position;

determining a first probability value based at least in part on the first combined probability distribution and the first relative position;

determining a second probability value associated with the vehicle at a second time along the first vehicle trajectory;

determining a cost associated with the first probability value and the second probability value; and controlling the vehicle based at least in part on the cost.

15. The computer-readable media of claim 14, wherein the operations comprise:

determining a second vehicle probability distribution associated with the vehicle at the second time along the first vehicle trajectory;

determining a second object probability distribution associated with the object at the second time along the first object trajectory;

determining a second combined probability distribution based at least in part on the second vehicle probability distribution and the second object probability distribution;

determining a second relative position between the vehicle and the object at the second time based at least in part on the second vehicle position and the second object position; and determining the second probability value based at least in part on the second combined probability distribution and the second relative position, wherein the vehicle is controlled based at least in part on the second probability value.

16. The computer-readable media of claim 15, wherein operations comprise:

determining an overall cost value associated with the first vehicle trajectory, the overall cost value being calculated based at least in part on the first probability value and the second probability value.

17. The computer-readable media of claim 16, wherein the operations comprise:

determining a first cost value based at least in part on the first probability value and a first weighting; and determining a second cost value based at least in part on the second probability value and a second weighting, wherein the overall cost value is determined based at least in part on the first cost value and the second cost value.

18. The computer-readable media of claim 17, wherein the first weighting is greater than or equal to the second weighting.

19. The computer-readable media of claim 14, wherein the operations comprise:

receiving a further vehicle trajectory associated with the vehicle in the environment;

determining a further vehicle probability distribution associated with the vehicle at the first time along the further vehicle trajectory;

determining a further combined probability distribution based at least in part on the further vehicle probability distribution and the first object probability distribution;

determining a further relative position between the vehicle and the object at the first time based at least in part on the further vehicle position and the first object position;

determining a further probability value based at least in part on the further combined probability distribution and the further relative position; and determining a particular trajectory of the first vehicle trajectory and the further vehicle trajectory based on the first probability value and the further probability value, wherein the vehicle is controlled according to the particular trajectory.

20. The computer-readable media of claim 15, wherein the first vehicle probability distribution, the first object probability distribution, and the first combined probability distribution comprise Gaussian distributions, wherein the first combined probability distribution is determined based at least in part on a sum of the first vehicle probability distribution and the first object probability distribution, and wherein the operations comprise:

determining a confidence ellipse based at least in part on the first combined probability distribution; and determining a first quadratic approximation of the first combined probability distribution, wherein the first probability value is determined based at least in part on the first quadratic approximation and the confidence ellipse.

* * * * *